US008473307B2

(12) United States Patent
Dove et al.

(10) Patent No.: US 8,473,307 B2
(45) Date of Patent: Jun. 25, 2013

(54) FUNCTIONALITY FOR PROVIDING CLINICAL DECISION SUPPORT

(75) Inventors: Bryan J. Dove, Seattle, WA (US); David B. Fusari, Groton, MA (US); Michael J. Bortnick, Oswego, IL (US); Michael T. Gillam, Silver Spring, MD (US)

(73) Assignee: Microsoft Corporation, Redmond, WA (US)

( * ) Notice: Subject to any disclaimer, the term of this patent is extended or adjusted under 35 U.S.C. 154(b) by 145 days.

(21) Appl. No.: 12/970,982

(22) Filed: Dec. 17, 2010

(65) Prior Publication Data

US 2012/0158421 A1    Jun. 21, 2012

(51) Int. Cl.
*G06Q 50/00*    (2012.01)
(52) U.S. Cl.
USPC ............................................. 705/2
(58) Field of Classification Search
USPC ....................................... 705/2–3
See application file for complete search history.

(56) References Cited

U.S. PATENT DOCUMENTS

| | | | |
|---|---|---|---|
| 6,551,243 B2 | 4/2003 | Bocionek et al. | |
| 7,424,679 B1* | 9/2008 | Lamer et al. | 715/737 |
| 2002/0099273 A1* | 7/2002 | Bocionek et al. | 600/300 |
| 2002/0156792 A1 | 10/2002 | Gombocz et al. | |
| 2004/0064341 A1 | 4/2004 | Langan et al. | |
| 2005/0137908 A1 | 6/2005 | Fusari et al. | |
| 2006/0052945 A1 | 3/2006 | Rabinowitz et al. | |
| 2006/0287890 A1 | 12/2006 | Stead et al. | |
| 2007/0214495 A1* | 9/2007 | Royer et al. | 726/2 |
| 2008/0097965 A1 | 4/2008 | Alsafadi | |
| 2010/0011302 A1 | 1/2010 | Stein et al. | |
| 2010/0076783 A1* | 3/2010 | Mathur | 705/2 |
| 2010/0138231 A1 | 6/2010 | Linthicum et al. | |

OTHER PUBLICATIONS

Altman et al., "An Evaluation of the Transfer Model for Sharing Clinical Decision-Support Applications," retrieved at <<http://www.ncbi.nlm.nih.gov/pmc/articles/PMC2233114/pdf/procamiaafs00002-0505.pdf>>, Proceedings of the AMIA Annual Fall Symposium, 1996, 5 pages.

"Amalga Products," retrieved at <<http://www.microsoft.com/amalga/products/products-overview.mspxMicrosoftAmalga>>, retrieved on Dec. 16, 2010, Microsoft Amalga, Microsoft Corporation, Redmond, Washington, 1 page.

"Microsoft HealthVault," retrieved at <<http://en.wikipedia.org/wiki/Microsoft_HealthVault>>, Wikipedia.org entry, accessed on Dec. 16, 2010, 3 pages.

* cited by examiner

*Primary Examiner* — Valerie Lubin
*Assistant Examiner* — Robert Sorey

(57) ABSTRACT

An information management system (IMS) is described herein that provides supplemental information to a user who is interacting with an application module. In one implementation, the IMS includes a collection system, an information extraction module, and a notification system. The collection system provides collected information from one or more information sources. The information extraction module extracts application information from the application module, even though the application module may lack a native interface for providing the application information. The analysis engine determines supplemental information to present to the user based on the collected information and the application information. And the notification information provides notification information which alerts the user to the existence of the supplemental information. In one scenario, the IMS can be applied in a healthcare-related domain.

20 Claims, 13 Drawing Sheets

FUNCTIONALITY FOR PROVIDING CLINICAL DECISION SUPPORT

BACKGROUND

A wealth of information is currently available to physicians (and other medical professionals) to provide assistance in treating patients. Further, systems now exist for aggregating this information into a central repository. However, physicians often access this information through disparate application modules and associated workflows. Each application module may allow a physician to access a subset of information pertaining to a particular patient and process that information using particular functionality. For example, a physician may use a first application module to interact with lab results, a second application module to review the medical literature, a third application to prescribe medication to patients, and so on. After interacting with several such application modules, the physician can then manually correlate and synthesize the insights provided by the disparate application modules. However, this approach is inefficient and burdensome. This approach is also prone to errors. For example, a physician may use a collection of tools in treating a patient which fails to reveal pertinent information regarding the patient; as a result, the physician may make an incorrect or non-optimal decision regarding treatment provided to this patient.

To address this issue, a developer may attempt to reconfigure plural application modules into a larger cohesive body of functionality. However, this solution is not feasible in many cases. For example, the redesign of software is a time-consuming and expensive task. Further, different application modules are often produced by different respective providers based on different design paradigms; hence, these modules can be considered non-cooperating functionality with respect to each other. This issue compounds the difficulty of integrating the functionalities provided by the application modules.

The above-described challenges are cited by way of example, not limitation; other challenges may exist. Further, other environments (besides healthcare-related environments) may face similar challenges.

SUMMARY

An information management system (IMS) is described herein that provides supplemental information to a user who is interacting with an application module. That supplemental information pertains to information that complements the information that is natively available to the application module. In some cases, for instance, the supplemental information comprises information that is not natively provided by the application module; in other cases, the supplemental information comprises information that is presented in a manner that differs from (or otherwise complements) information delivery provided by the application module, and so on. In one implementation, the IMS can include a collection system, an information extraction module, an analysis engine, and a notification module.

The collection system receives collected information from one or more information sources. The information sources can include any number of sources that are internal to an enterprise environment in which the user interacts with the application module, and any number of sources that are external to the enterprise environment.

The information extraction module (IEM) extracts application information from the application module. The application information reflects a current context of an interaction between the application module and the user. In one implementation, the information extraction module is configured to extract application information from any application module, including an application module that lacks a native interface for providing the application information.

The analysis engine receives the collected information from the collection system and the application information from the IEM. Based on this received information, the analysis engine presents supplemental information to the user that enhances content delivered via the application module. To perform this task, the analysis engine can rely on any combination of analysis modules selected from a suite of available analysis modules.

The notification module presents notification information to the user. The notification information alerts the user to the existence of the supplemental information. In response to the notification information, the user can make a request to receive the supplemental information. Or the notification module can immediately deliver the supplemental information.

According to one illustrative use, the application module provides functionality for use in a healthcare-related domain. In this scenario, the user may correspond to a physician or other medical professional. The current context extracted from the application module may identify a task that is being performed with respect to a patient or focus of interaction (referred to herein as a target focus).

By virtue of the features summarized above, the IMS can provide an efficient mechanism for providing a wide variety of pertinent information to a user, irrespective of whether the application module with which the user is interacting was originally designed to supply such information. This wealth of information and assistance enables the user to more efficiently make appropriate decisions regarding the care of patients. Further, the IMS can provide a satisfactory user experience to the user. For instance, the IMS eliminates (or reduces) the need for the user to engage in independent interactions with separate information sources.

The above functionality can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative information management system (IMS) for providing supplemental information to a user (such as a physician or other provider of care) in the context of the user's interaction with an application module. Section B describes illustrative methods which explain the operation of the IMS of Section A. Section C describes illustrative processing functionality that can be used to implement any aspect of the features described in Sections A and B.

Figure 13:
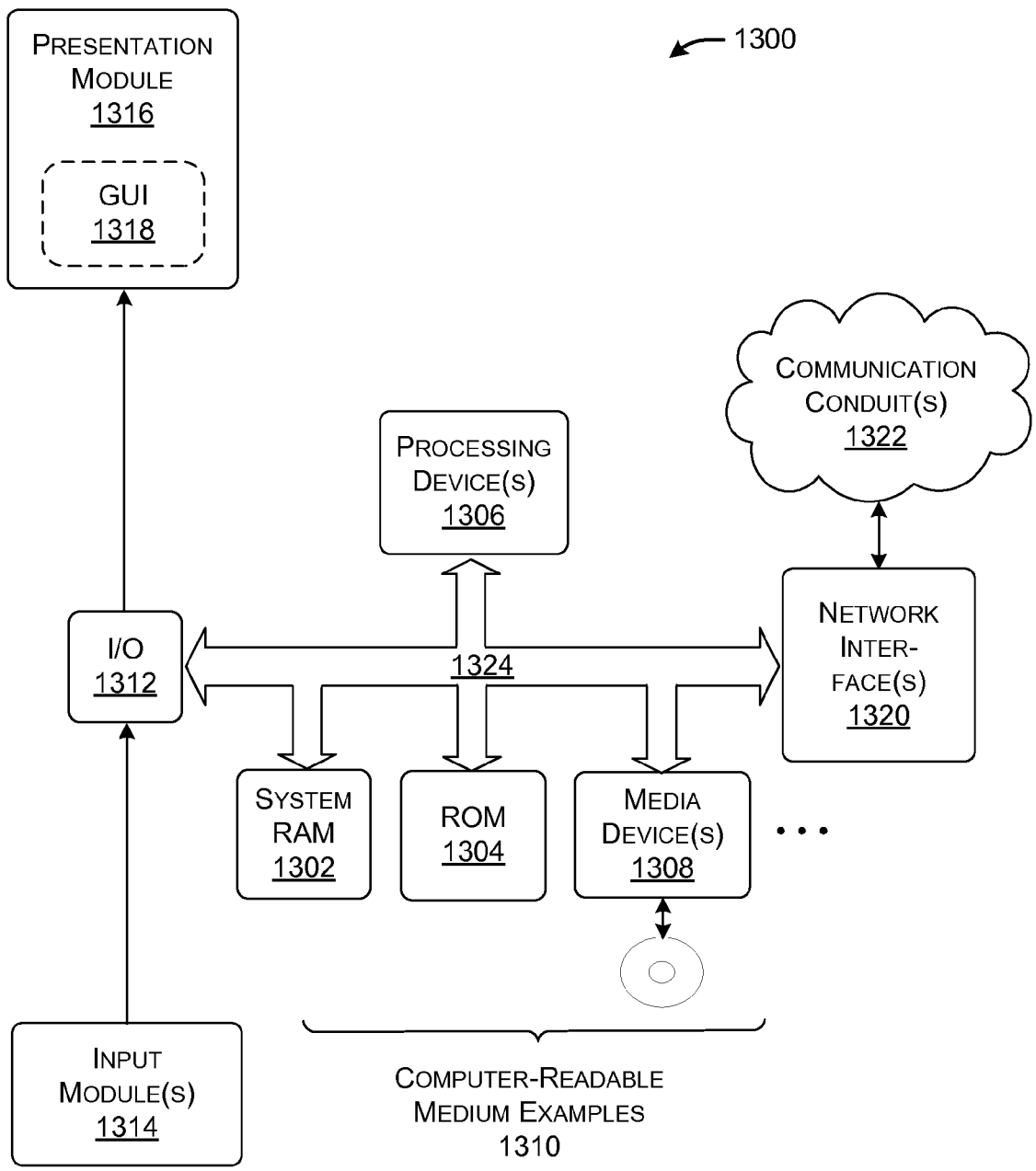
FIG. 13 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms (for instance, by software, hardware, firmware, etc., and/or any combination thereof). In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 13, to be discussed in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms (for instance, by software, hardware, firmware, etc., and/or any combination thereof).

As to terminology, the phrase "configured to" encompasses any way that any kind of physical and tangible functionality can be constructed to perform an identified operation. The functionality can be configured to perform an operation using, for instance, software, hardware, firmware, etc., and/or any combination thereof The term "logic" encompasses any physical and tangible functionality for performing a task. For instance, each operation illustrated in the flowcharts corresponds to a logic component for performing that operation. An operation can be performed using, for instance, software, hardware, firmware, etc., and/or any combination thereof When implemented by a computing system, a logic component represents an electrical component that is a physical part of the computing system, however implemented.

The following explanation may identify one or more features as "optional." This type of statement is not to be interpreted as an exhaustive indication of features that may be considered optional; that is, other features can be considered as optional, although not expressly identified in the text. Similarly, the explanation may indicate that one or more features can be implemented in the plural (that is, by providing more than one of the features). This statement is not be interpreted as an exhaustive indication of features that can be duplicated. Finally, the terms "exemplary" or "illustrative" refer to one implementation among potentially many implementations.

A. Illustrative De-Identification System

Figure 1:
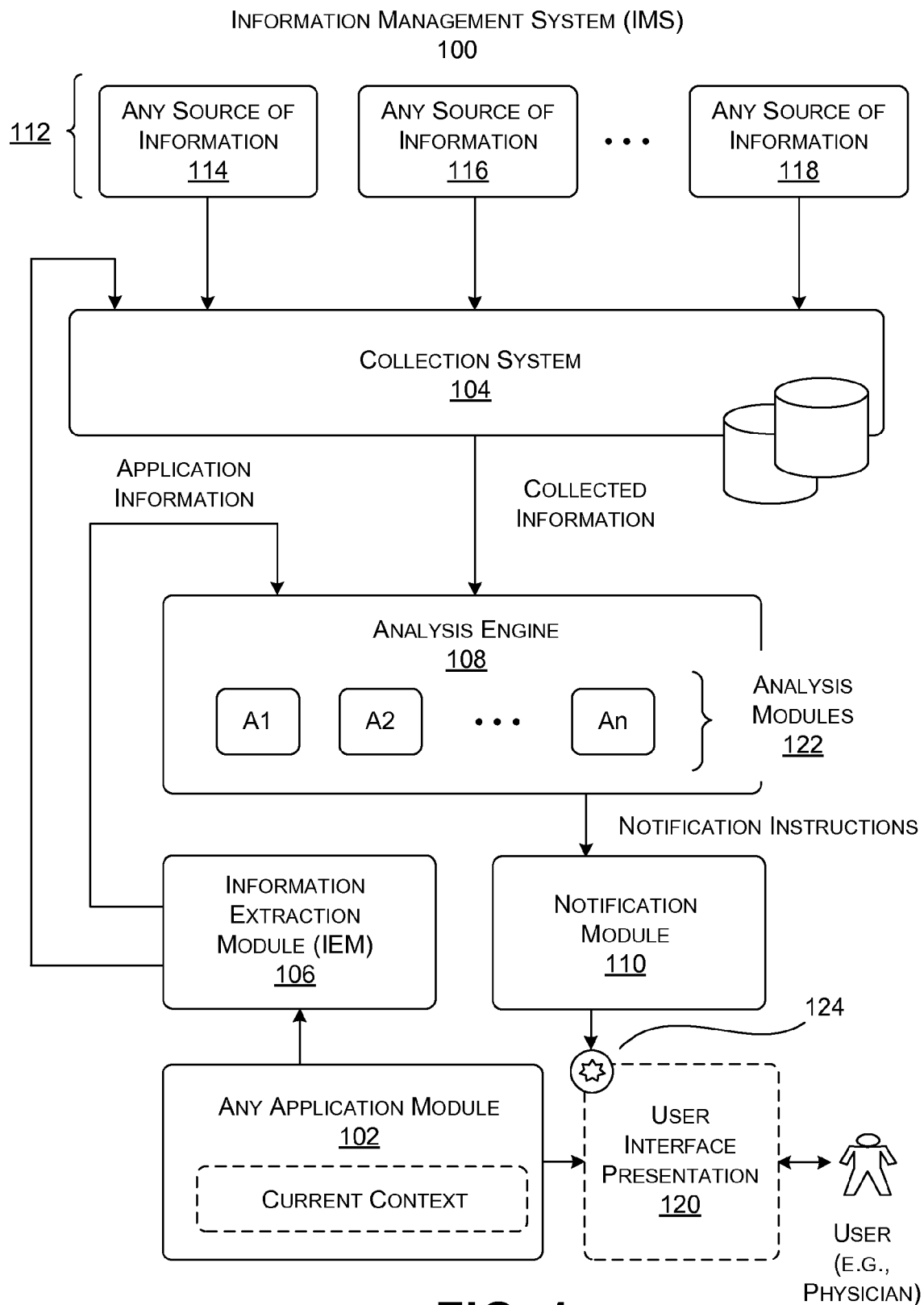
FIG. 1 shows an illustrative information management system (IMS) for providing information to a user in the course of the user's interaction with an application module. The IMS can include a collection system, an information extraction module, an analysis engine, and a notification module.

FIG. 1 shows an illustrative information management system (IMS) 100 for providing information to a user to assist a user in making a decision. In the examples featured in this application, the IMS 100 provides information which enables a physician (or other medical personnel) in providing care to patients. However, the IMS 100 can also be applied to other environments in which a first person provides assistance to one or more other individuals. For example, in an academic environment, the IMS 100 can provide information which enables an administrator in providing assistance to students. In other cases, an end user can interact with the IMS 100 to pursue any other objective, including a personal objective that does not impact another individual.

From a high-level perspective, the IMS 100 provides supplemental information to a user while the user interacts with an application module 102. The information is considered supplemental in the sense that the application module 102 may not natively provide this information. To cite merely one example, the user may interact with an application module that enables the user to prescribe medication to the patient. As originally designed, that application module may not provide information regarding the insurance coverage of the patient. However, the IMS 100 can recognize that insurance information is relevant to the user's current interaction with the application module. The IMS 100 can then alert to the user to the existence of the supplemental insurance information. This behavior is achieved without modifying the interfaces provided by the application module.

Alternatively, or in addition, the supplemental information corresponds to information that is available to the application module 102. But the IMS 100 includes analysis functionality (to be described below) which delivers the information to the application module 102 in a manner that is not natively provided by the application module 102, or which otherwise complements information delivery in the application module 102. For example, the application module 102 may have native functionality that allows a user to manually access medication alerts. The IMS 100 can supplement this native functionality by also automatically delivering the medication alerts to the user at particular relevant junctures of the user's interaction with the application module 102.

Alternatively, or in addition, the supplemental information provides an analysis result that is derived based on raw data that is available to the application module 102, but the application module 102 itself does not have the capacity to provide such an analysis result. To cite one concrete example, the IMS 100 can provide an analysis module which generates a diagnosis or alert primarily on the basis of lab data or the like. The application module 102 may have access to the same lab data, but not to the diagnostic information imparted by the analysis module. Hence, that diagnostic information comprises supplemental information that can be said to be unavailable to the application module 102.

In the following explanation, the term supplemental information is given the above-described expansive meaning. The supplemental information encompasses any "raw" information derived from any information source, as well as any information that is derived from this raw information, as well as an experience by which the information is delivered to the user, etc.

To perform these functions, the IMS 100 can include (or can be conceptualized to include) a series of modules, namely a collection system 104, an information extraction module 106, an analysis engine 108, and a notification module 110. These modules are described below in turn.

To begin with, the collection system 104 receives information from one or more information sources 112 (e.g., including the generically-labeled information source 114, information source 116, information source 118, etc.). In one case, the user can interact with the application module 102 within a particular enterprise environment, such as within a system associated with a hospital. In this case, one or more of the information sources 112 may be internal to the enterprise environment. In addition, or alternatively, one or more of the information sources 112 may be external to the enterprise environment.

In a healthcare-related enterprise environment, a first internal information source may correspond to a general hospital information system for managing the care of patients within a hospital. A second internal information source may correspond to a lab system which provides lab results for patients. A third internal information source may correspond to a radiology department which provides imaging results for patients. A fourth internal information source may correspond to an out-patient administrative system, and so on.

The healthcare-related enterprise environment may also provide application modules for interacting with particular types of information sources. For example, a lab-related application module may be configured to interact with lab information provided by a laboratory system. These application modules may also supply information to the IMS 100. As such, these applications also comprise information sources which contribute to the information received by the collection system 104. For example, a lab technician may use the lab-related application module to input blood count information for a particular patient. This information contributes to the corpus of information maintained by the collection system 104.

As to possible external information sources, a first external information source may correspond to an external lab system. A second external information source may correspond to an external hospital system of any type (e.g., from a "partner" medical institution). A third external information source may correspond to a research database which provides information regarding medical research, such as the PubMed database. A fourth external information source corresponds to a government entity, such as, in the United States, the Food and Drug Administration (FDA), the Centers for Disease Control and Prevention (CDC), National Institutes of Health (NIH), Centers for Medicare and Medicaid Services (CMS), and so on. A fifth external information source may correspond to a non-governmental provider of medical information, such as WebMD (headquartered in New York, N.Y.). A sixth external information source may correspond to a system which allows end users to maintain personal health information repositories, such as HealthVault™, provided by Microsoft® Corporation of Redmond Wash., and Google Health™, provided by Google, Inc. of Mountain View, Calif., etc. These examples are merely illustrative, not exhaustive.

The collection system 104 can use any technology to receive the information from the various information sources 112. For example, the collection system 104 can provide any combination of push-related technologies and pull-related technologies to collect information from the information sources 112. Upon receipt, the collection system 104 can parse, classify, and store the information. The collection system 104 can use any ontology and associated tagging approach to classify the information. In one implementation, the collection system 104 can use one or more commercially-available systems to collect the information, such as Microsoft® Amalga™, provided by Microsoft® Corporation of Redmond, Wash.

The information extraction module (IEM) 106 collects information from the application module 102 with which the user is interacting. From a high-level perspective, the IEM 106 attempts to extract information which characterizes the context of the user's current interaction with the application module 102. The term context may have plural aspects. For example, in one environment, the context of an interaction may correspond to the task (or tasks) that the user appears to be attempting to accomplish. The user's task may be directed at a particular entity, such as a patient. If so, the context may also correspond to the identity of that entity. To cite one example, in a healthcare-related domain, the context may indicate that the user (a physician) is attempting to prescribe a certain medication to a patient named John Jones.

More generally, the context of an interaction can pertain to any focus of interest, referred to herein as a target focus. For example, in another case, the target focus of an interaction corresponds to a group of patients. In another case, the target focus can correspond to a doctor or other medical professional. In other cases, the target focus can correspond to non-human entities, such as an institution, a procedure or treatment, lab results, and so on.

The IEM 106 can provide one or more techniques for extracting the application information from the application module 102. In one approach, the application module 102 provides a native interface for exposing the application information. For example, in one case, the application module 102 may have been designed with the express objective of allowing external entities to query the application module 102 and obtain certain kinds of information from the application module 102. For example, the application module 102 may provide an application programming interface (API) to expose application information. In this case, the IEM 106 can interact with the application module 102 in a manner that conforms to the expectations of whatever native interface(s) that it provides to external entities.

Figure 3:
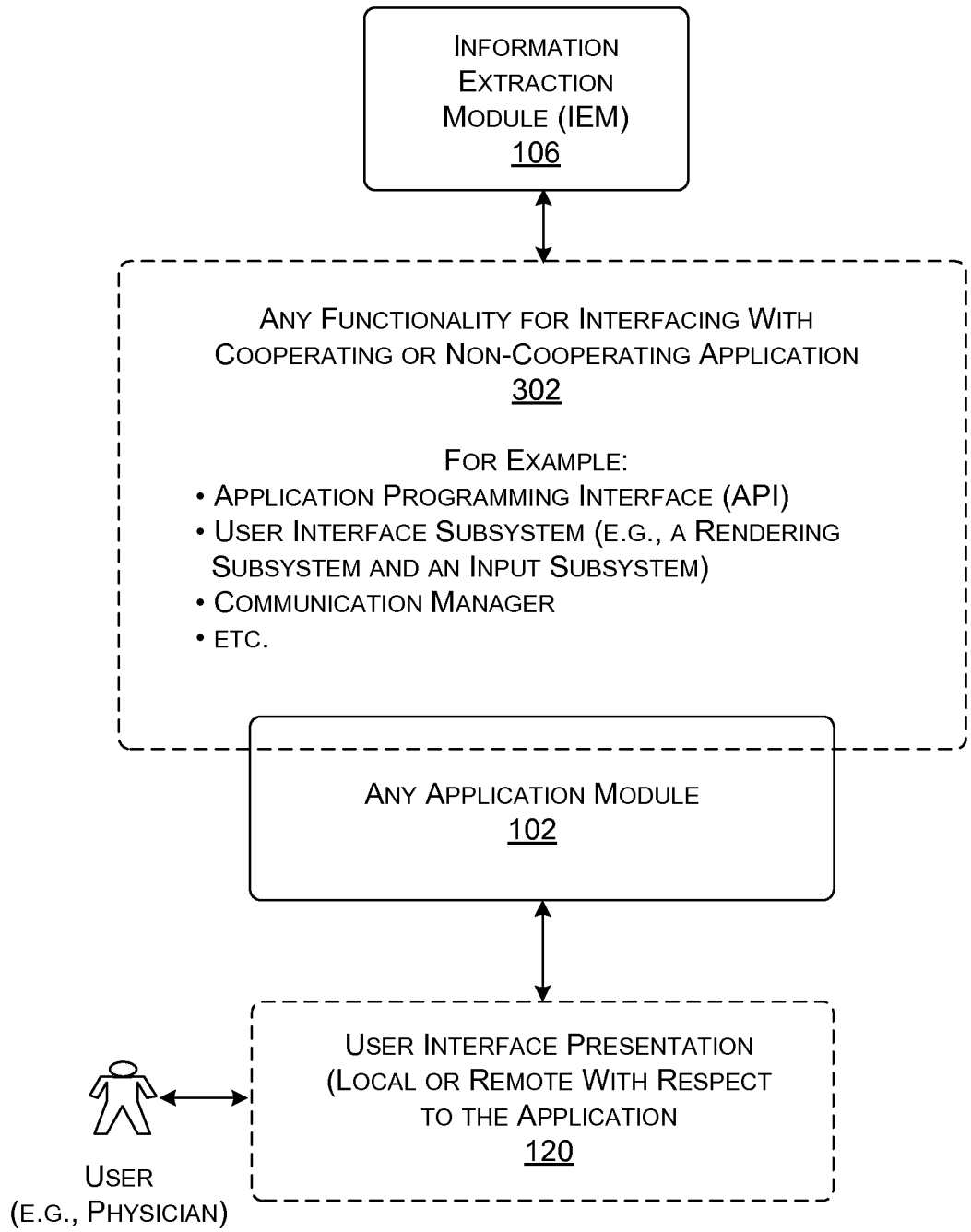
FIG. 3 shows functionality that demonstrates one manner of operation of the information extraction module of FIG. 1.

In another case, the application module 102 does not provide a native interface for exposing at least some of the application information which the IEM 106 seeks to collect. In that case, the IEM 106 can use various techniques for indirectly extracting the application information from the application module 102. For example, in a first technique, the IEM 106 can extract the application information from a user interface subsystem (not shown in FIG. 1). The interface subsystem is a mechanism through which the user interacts with the application module 102 via a user interface presentation 120. In a second technique, the user interacts with the application module 102 over a communication medium (e.g., a network); here, the IEM 106 can extract the application information from a communication manager (not shown in FIG. 1). The communication manager is a mechanism through which the application module 102 forwards application information over the communication medium. The application module 102 can use still other techniques for harvesting application information. FIG. 3 and the accompanying description provide addition information regarding the operation of the IEM 106.

The analysis engine 108 receives collected information that originates from the information sources 112. The analysis engine 108 further receives the application information from the IEM 106. Based on this information, the analysis engine 108 determines supplemental information that can be presented to the user to assist the user in his or her interaction with the application module 102. As stated above, the information is considered supplemental in the sense that the application module 102 may not provide native (original) functionality for delivering this information to a user.

The analysis engine 108 can perform the above tasks using one or more analysis modules 122. Each analysis module can receive one or more input factors. The input factors may pertain to any aspect of the collected information and/or the application information. Based thereon, the analysis module can generate an indication of supplemental information that can be presented to the user in the course of the user's interaction with the application module 102. An individual analysis module can formulate its output as a notification instruction, which it passes to the notification module 110. The notification module 110 responds to the notification instruction by informing the user that supplemental information exists regarding the current context of the user's interaction with the application module 102. Alternatively, the notification module 110 can immediately forward the supplemental information for the user's perusal.

Any analysis module can provide any technology to generate a notification action. In one case, an analysis module can rely on one or more mapping rules. Each mapping rule maps one or more input factors to a notification action. In one case, each mapping rule can be implemented using an IF-THEN-ELSE logic structure. Alternatively, or in addition, an analysis module can rely on a machine learning model to provide a notification action. The machine learning model can be trained based on a corpus of previously collected observations. Alternatively, or in addition, an analysis module can rely on a neural network to provide a notification action. Like a machine learning model, the neural network can be trained based on a corpus of previous observations. Alternatively, or in addition, an analysis module can use any type of statistical analysis technology, fuzzy logic technology, inference-based technology, etc., to generate a notification action. Alternatively, or in addition, an analysis module can apply any type of forecasting or trend-determination functionality. These examples are presented by way of illustration, not limitation. Further, these examples are not mutually exclusive; for example, an analysis module that performs trending analysis may rely on statistical modeling, etc.

Any enterprise environment (such as a hospital) can select the types of analysis modules which are to be applied. In one case, the enterprise environment may apply some general-purpose analysis modules which are universally pertinent. These analysis modules correspond to default modules. The enterprise environment may also apply other analysis modules which are customized to address particular demands of the enterprise environment. The enterprise environment may apply still other analysis modules which are customized by individual providers of care, such as individual physicians.

In one case, any analysis module can be configured to receive and respond to the current context of a user's interaction with the application module 102. Alternatively, or in addition, any analysis module can be configured to receive and respond to a history of the user's interaction with the application module 102, e.g., extending over any specified window of time. Alternatively, or in addition, any analysis module can be configured to receive and respond to application information collected from plural application modules with which the user has interacted over a specified window of time.

Further, an analysis module can use different selection strategies in selecting information from the corpus of information maintained by the collection system 104. For example, an enterprise environment or individual user may configure an analysis module to receive and respond to certain information sources supplied by the collection system 104. For example, an individual physician can configure an analysis module in this manner by subscribing to various information sources. Alternatively, or in addition, an analysis module can be configured to respond to collected information corresponding to any time span. For example, an analysis module can be configured to respond to medical alerts provided by a government agency which are no more than three months old, and so on. Further, the analysis module can be configured to analyze any portion of a patient's medical history, including the entirety of the patient's medical history. Alternatively, or in addition, an analysis module can be configured to respond to collected information only if it exceeds an identified threshold. For example, an analysis module can provide a notification alert if a received blood pressure reading exceeds a prescribed threshold. More specifically, the analysis module can apply a default threshold that applies to all patients. In addition, or alternatively, an analysis module can apply a threshold which represents a prescribed deviation from a baseline reading associated with a particular patient or patient group.

In some cases, an analysis module can be configured to respond to information which pertains to a single entity, such as a single patient. In other cases, an analysis module can be configured to perform analysis on information that pertains to a population of patients. For example, an analysis module can be configured to identify a population that shares some characteristic (or characteristics) with the patient identified in the current context. For example, the analysis module can be configured to identify a population that shares the same disease as the patient identified in the current context. The analysis module can then perform analysis based on that collection of data, e.g., by identifying norms associated with the identified population of patients and comparing the current patient's condition with those norms, etc. Similarly, an analysis module can be configured to identify and respond to information which pertains to a specified geographic area, such as specific city, state, region, etc.

The features and behaviors of the analysis modules described above are presented by way of example, not limitation.

To further clarify the operation of the analysis engine 108, consider the following illustrative use scenarios. In a first scenario, assume that the user is in the process of interacting with an out-patient management system. More specifically, assume that the user is currently prescribing a certain medication to a patient. An analysis module can receive application information from the IEM 106 which identifies the particular patient. The application information can also indicate that the user is in the process of prescribing a certain type of medication to the patient. The analysis module can also receive collected information from the collection system 104, originating from one or more governmental agencies and research databases. Based on these input factors, the analysis module can determine whether there are any alerts regarding the medication in question. Some alerts may apply to all patients, while others may apply to only patients who have certain characteristics (such as pregnant women). If there any applicable alerts within a prescribed window of time, the analysis module can instruct the notification module to notify the user of such alerts.

In a second scenario, assume that the user is again prescribing a certain medication to a patient via an out-patient management system. An analysis module can again receive the above-described application information, identifying both the patient and the medication being prescribed. The analysis module can also receive collected information from an insurance-related information source. Based on these input factors, the analysis module can determine whether the medication is properly covered by the patient's insurance. If not, the analysis module can instruct the notification module to notify the user of such a finding.

In a third scenario, assume that the user is entering notes in an out-patient management system regarding the progress that a patient is making in a prescribed physical therapy program. An analysis module can receive application information which identifies the patient. The analysis module can also receive keywords within the user's notes which indicate the injury from which the patient is recovering. The analysis module also receives collected information from an external source which described recommended protocols for treating patients with the type of injury at issue. If such guidelines exist, the analysis module can instruct the notification module to alert the user to such protocols. Or the analysis module can selectively inform the user of parts of the protocol which appear to have not been performed yet. In another case, the analysis module can identify a population of other patients with similar conditions, diagnoses, observations, etc. to the current patient. The analysis module can then provide a recommendation for the current patient based on an assessment of treatments that have proven effective for the population of similar patients.

In a fourth scenario, assume that the user is using an application module to view images taken of a patient's heart. An analysis module can receive application information which indicates the identity of the patient. The application information can also indicate the task that is being performed by the user (namely, an examination of an image of the patient's heart). The analysis module can also receive collected information from a laboratory-related source. Based on these input factors, the analysis module can determine whether any laboratory results have a bearing the images that the user is viewing. For example, the analysis module can determine that a cholesterol reading and a blood sugar reading are appropriate to the user's analysis of the medical images. If so, the analysis module can send an instruction to the notification module 110 to alert the user to these findings.

The above-described fourth scenario is instructive in drawing out the possible real-time nature of the decision support provided by the IMS 100. For example, a lab technician may have entered a cholesterol reading using a lab-related application program during the time at which a physician is viewing images of the patient's heart. The collection system 104 receives these lab results. The analysis engine 108 in conjunction with the notification module 110 can then alert the physician to the existence of these records while the physician is viewing the images. In this sense, the IMS 100 accomplishes a real-time coupling of disparate application modules that were not originally designed to work together. This coupling is performed without modifying either of the application modules to take account of each other's presence; each application module can continue to operate in an independent manner, and, indeed, may be unaware of the way in which other application modules are making use of its native data.

In a fifth scenario, the user may be interacting with application module that identifies the lab results for a particular person with a yet-unidentified disease or condition. An analysis module can receive application information which identifies the patient, as well as the lab results for this patient. In this case, the analysis module can feed the lab results to an engine (such as a statistical model or neural network) which identifies a possible diagnosis of the patient, or which identifies a particular health-related trend. Alternatively, or in addition, the analysis module can receive and analyze epidemiological information received from a government source, such as the CDC. The analysis module can then notify the user of the results of its analysis.

In sixth scenario, the user may be interacting with an application module in response to the arrival a new patient in an emergency room. An analysis module can receive application information which identifies the patient. The analysis module can also receive information that the patient has previously compiled and stored in a personal health repository, such as Microsoft® Corporation's HealthVault$^{TM}$ (if, in fact, the patient expressly authorizes the user to access this information). Based on these input factors, the analysis module can determine that the information obtained from the patient's personal repository may be helpful in providing emergency care to the patient. If so, the analysis module can send an appropriate notification instruction to the notification module 110.

The above scenarios are illustrative, rather than exhaustive. Further, the examples presented above were simplified to clarify explanation. But any analysis module can receive multiple types of input factors, originating from any aspect of the application information and any aspect of the collected information. Further, any analysis module can apply any combination of analysis techniques, applied over any span of time, patient population, geographic region, etc.

The supplemental information that is delivered to the user can take any form. In one case, any analysis module can formulate the information in text-based form, graph-based form, pictorial form, etc., or any combination thereof In one case, the supplemental information is static. In other cases, the supplemental information can be delivered in an interactive experience, and so on. These examples representative, not exhaustive.

In any of the above-identified cases, the IMS 100 can maintain appropriate safeguards to protect the confidentiality of patient information. Further, the IMS 100 can allow patients to expressly opt in or opt out of the collection of any type of personal information.

Having performed its analysis, the analysis engine 108 can send one or more notification instructions to the notification module 110. The notification instructions can encompass multiple categories notification actions, e.g., pertaining to multiple categories of alerts and advice. For example, at a particular juncture in the user's interaction with the application module 102, the analysis engine 108 can provide notification instructions pertaining to lab results, radiology results, insurance information, medication alerts, epidemiological alerts, and so on. The analysis engine 108 can also provide notification instructions pertaining to advice and recommendations of any type, diagnoses, etc.

The notification module 110 receives the notification instructions and, in response thereto, provides notification information to the user. The notification information alerts the user to the existence of the supplemental information which may be of use in performing whatever task the user is currently engaged in. In one case, the notification module 110 can convey the notification information via an indicator 124 of any type that is presented on the user interface presentation 120. The user can activate the indicator 124 to receive the supplemental information. The examples which follow will provide additional information regarding the manner in which the notification module 110 can deliver supplemental information to the user.

In some cases, the notification module 110 provides the notification information in visual form, e.g., as an icon which is presented on a graphical user interface presentation. In addition, or alternatively, the notification module 110 can provide audible notification information, haptic notification information, and so on Considered as a whole, the IMS 100 provides an overarching framework which allows a heterogeneous collection of application modules to receive information from a variety of information sources (including other application modules which supply information). Through these provisions, the IMS 100 can allow a user to make more informed decisions regarding the care given to patients. At the same time, the IMS 100 does not demand expensive, time-consuming, and error-prone re-engineering of the heterogeneous application modules, although the IMS does not preclude some such modification.

Figure 2:
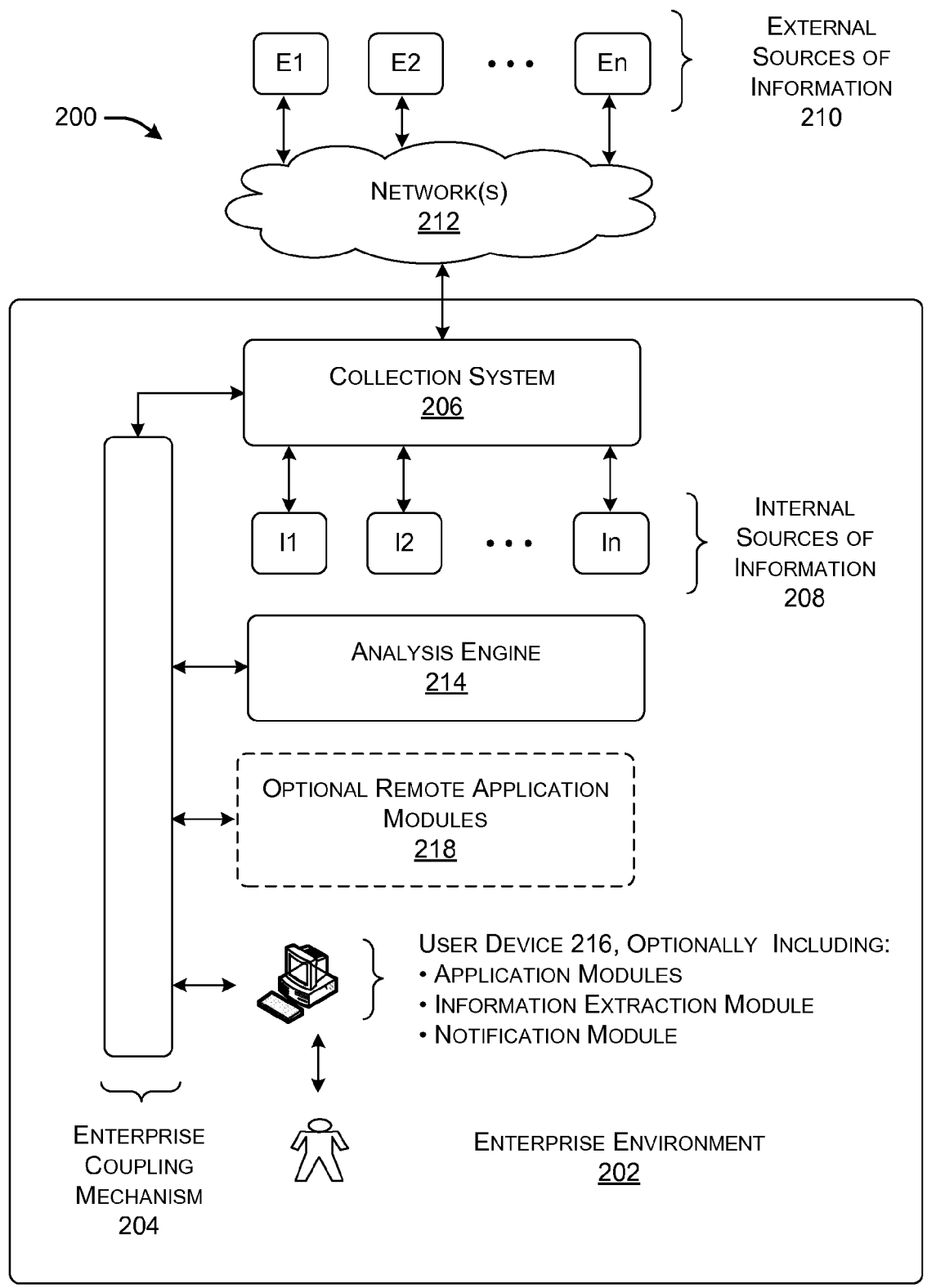
FIG. 2 shows one implementation of the IMS of FIG. 1.

Advancing now to FIG. 2, this figure shows one implementation 200 of the functional modules of the IMS 100 of FIG. 1. As shown there, an enterprise environment 202 corresponds to a particular setting (such as a hospital setting) in which care is provided to a plurality of patients. FIG. 2 shows functionality which is internal to the enterprise environment 202, and functionality which is external to the enterprise environment 202. A coupling mechanism 204 of any type can connect together the internal functionality of the enterprise environment 202. For instance, the coupling mechanism 204 may correspond to any type of local area network, wide area network, or combination thereof The enterprise environment 202 may provide a collection system 206 which receives information from one or more internal information sources 208 and/or one or more external information sources 210. The collection system 206 may interact with the external information sources 210 via one or more networks 212, such as a wide area network (e.g., the Internet). These information sources (208, 210) may correspond to any of the types of information sources described above in connection with FIG. 1.

The enterprise environment 202 may provide an analysis engine 214 which performs the functions described above with reference to FIG. 1. Namely, the analysis engine 214 receives collected information from the collection system 206 and application information from application modules. Based thereon, the analysis engine 214 identifies supplemental information to present to the users who are interacting with the application modules. In some cases, the supplemental information corresponds to "raw" information provided by the various information sources (208, 210). Alternatively, or in addition, the supplemental information can correspond to derived information generated by an analysis module based on the raw information provided by the various information sources (208, 210), etc.

FIG. 2 shows one user device 216 that a user may use to interact with any application module, as well as the more encompassing functionality provided by the enterprise environment 202. The user device 216 can correspond to any type of computing functionality, such as a stationary personal computer or workstation. Alternatively, the user device can also correspond to computing functionality that is integrated into medical equipment of any type. Alternatively, the user device can also correspond any type of portable computing functionality, such as a laptop computer, a tablet-type computing device, a personal digital assistant device, a mobile telephone device, and so on.

In one case, the user device 216 can locally implement an application module with which the user is interacting. That is, the user device 216 can store and execute the code that provides the application module. In another case, the user can operate the user device 216 to interact with one or more remote application modules 218. In other cases, the user can interact with an application module that is distributed between local and remote processing functionality.

The remote application modules 218 (if provided in a particular implementation) can be implemented by one or more server-type computing devices and associated data stores, etc. That equipment can be provided by functionality within the enterprise environment 202 and/or outside the enterprise environment 202. In one case, the remote application modules 218 can be implemented as network-accessible web sites or web services, and so on. In another case, the remote application modules 218 can be implemented by virtual desktop technology, e.g., as provided by Citrix Systems, Inc. of Fort Lauderdale, Florida, and so on.

Each user device can implement local instances of the IEM 106 and the notification module 110 of FIG. 1. In another case, the IEM 106 can be provided by functionality that is remote with respect to the user devices. Similarly, the notification module 110 can be provided by functionality that is remote with respect to the user devices.

Figure 6:
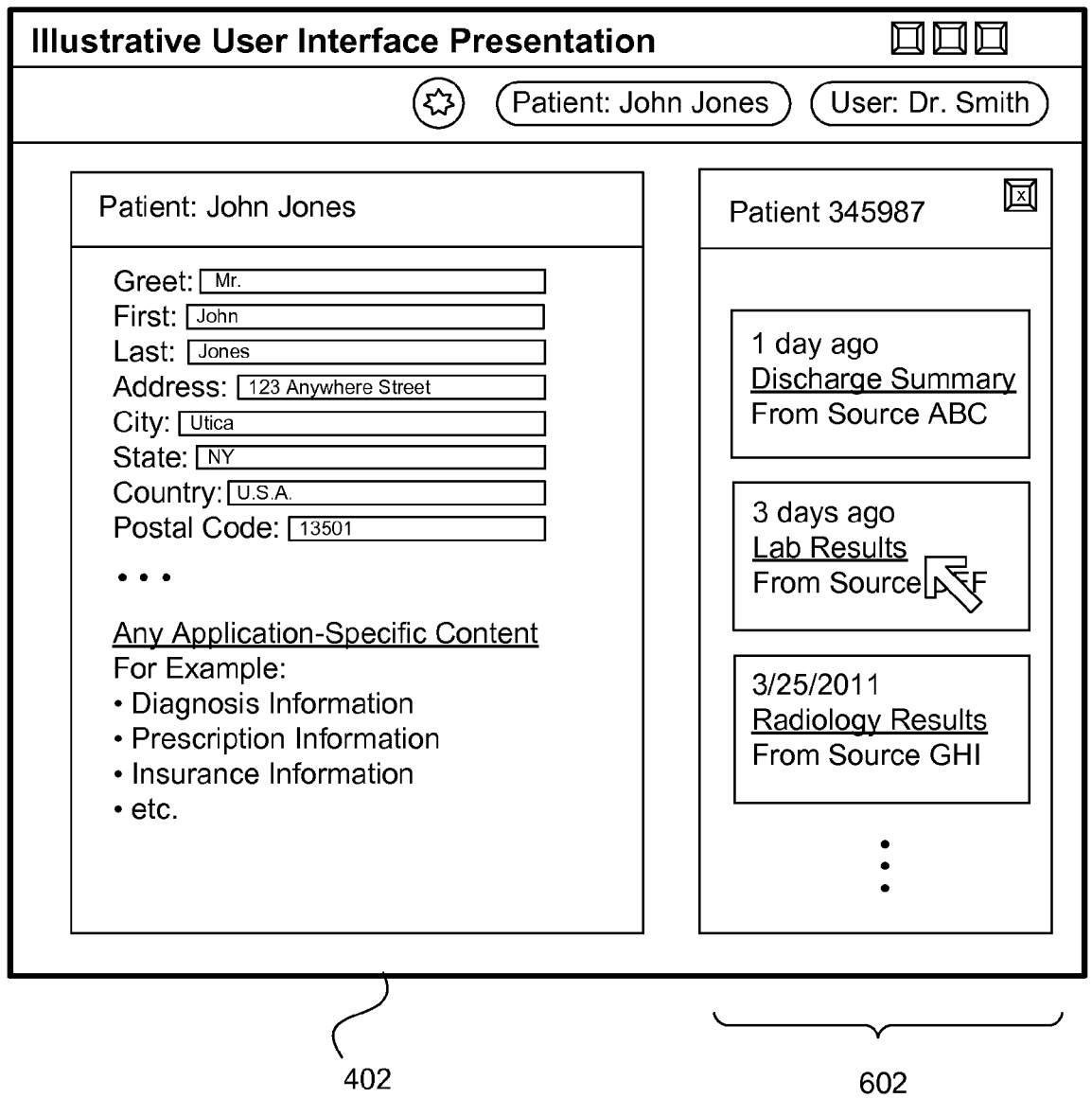

FIG. 3 shows various techniques by which the information extraction module (IEM) 106 of FIG. 6 can extract application information from the application module 102. Generally, the IEM 106 extracts the application information from functionality 302 which interfaces with the application module 102.

In one case, the functionality 302 can corresponds to a native interface provided by the application module 102, such as an application programming interface (API).

In a second case, the functionality 302 can correspond to an interface subsystem by which the user interacts with the application module 102. The interface subsystem, in turn, can include a rendering subsystem which displays information on the user interface presentation 120. The interface subsystem can also include an input subsystem by which the user supplies information to the application module 102, via the user interface presentation 120.

For example, the IEM 106 can extract information from the rendering subsystem that indicates the information that is being displayed on the user interface presentation 120 at a particular juncture in the user's interaction with the application module 102. For example, assume that the application module 102 provides an instruction to display a menu pertaining to a particular task. The IEM 106 can extract any type of information which describes the menu. For example, the IEM 106 can extract keywords and other content that are displayed by the menu. Alternatively, or in addition, the IEM 106 can extract codes (or the like) which indicate the nature of the menu, although the rendering subsystem may not necessarily display that code information to the user.

In addition, the IEM 106 can extract information from the input subsystem in response to input selections made by the user, e.g., in response to keystrokes, mouse click selections, mouse movements, and so on. More specifically, in one case, the IEM 106 can receive information that the user formally enters, e.g., by inputting the information and then activating a "submit" button, return key, or the like. Alternatively, or in addition, the IEM 106 can receive any keystrokes or mouse selections that the user makes without formally submitting an entry. For example, suppose the user types the patient's name or ID number in an input field, but without activating a submit command or the like. The IEM 106 can be configured to extract this application information and forward it to the analysis engine 108. And as a result, the user may receive supplemental information pertaining to the patient without formally activating a submit command.

In another scenario, assume that the user operates a user device to access an application module which is implemented by remote computing functionality. In this case, the local user device presents the user interface presentation 120, while the remote computing functionality executes the application module 102 itself In this scenario, the IEM 106 can also extract the application information from a communication manager. The communication manager refers to any functionality that monitors or manages communication between the application module 102 and the user device over a communication medium of any type. In particular, the IEM 106 can extract the application information from messages that the user device receives from or sends to the remote application module 102. The messages can be expressed in any network protocol (or protocols).

One way to implement extraction via a user interface subsystem or a communication manager is described in copending U.S. application Ser. No. 11/021,755, naming the inventors of David Fusari, et al., filed on Dec. 23, 2004, and entitled, "Methods and Apparatus for Externally Controlling a Software Application to Create New Application Behavior." This application is incorporated by reference herein in its entirety.

The IEM 106 can use different techniques to extract selected fields from this information. For example, when configuring the IEM 106, the user can identify selected user interface (UI) fields to extract from the application information, such as input fields within a form, menu item selections, etc. Further, the user can identify selected events which will trigger the extraction of the UI fields, such as page navigation selections, command button selections, etc.

The next series of figures show an illustrative scenario in which the IMS 100 of FIG. 1 can present supplemental information to the user in the course of the user's interaction with an application module. The application module can perform any core function. For example, the application module can correspond to an out-patient management system or the like.

Figure 4:
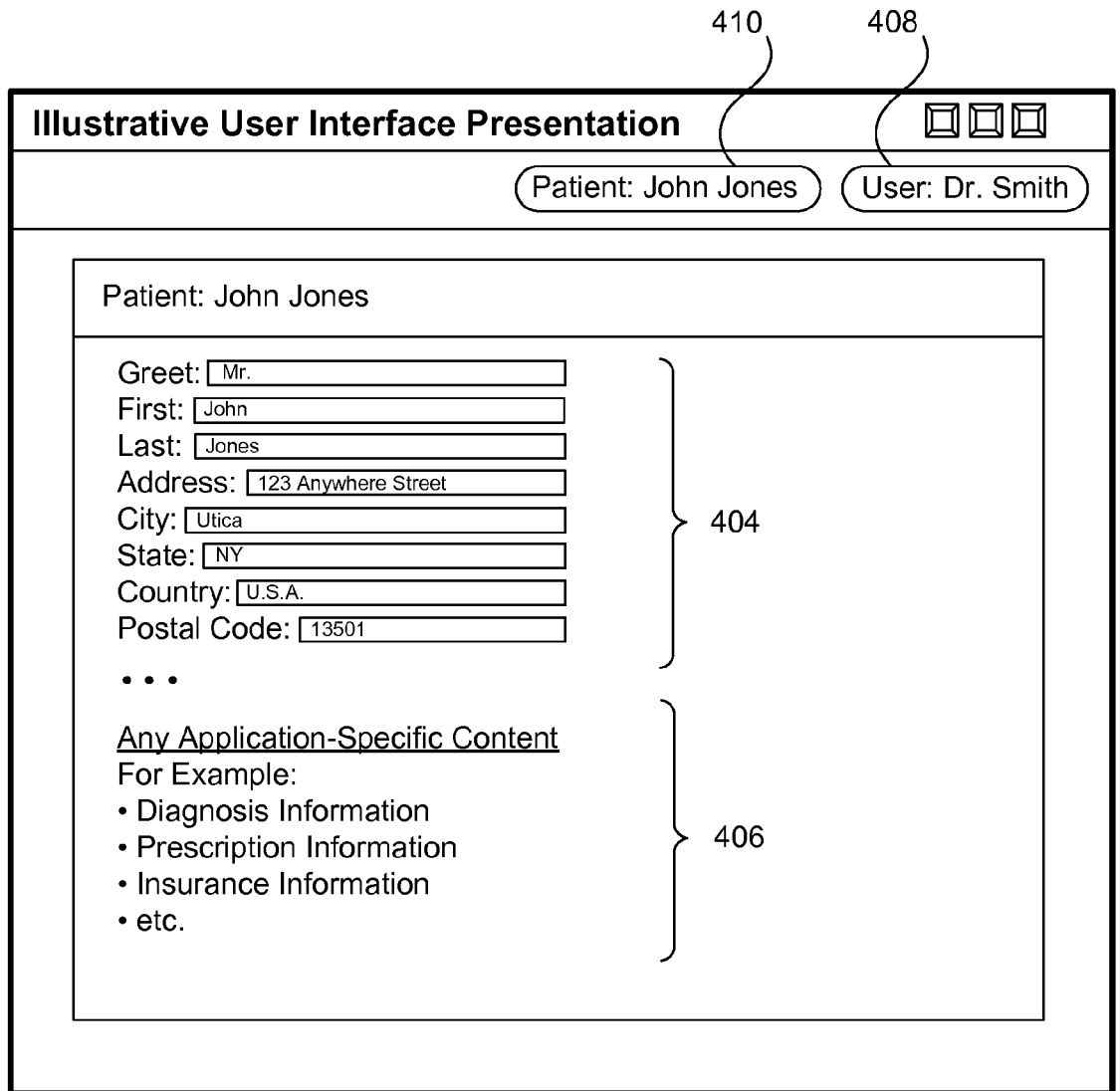
FIGS. 4-8 show illustrative user interface presentations that demonstrate one manner of operation of the IMS of FIG. 1.

Starting with FIG. 4, the application module presents a user interface presentation 402. In this merely illustrative case, the user interface presentation 402 provides a plurality of input fields 404 by which the user may enter information regarding a particular patient—the hypothetical John Jones. The user interface presentation 402 can also include a number of other fields 406 by which the user can perform other tasks (which are only generically indicated in FIG. 4). The user interface presentation 402 also includes a title field 408 which indicates the identity of the user who is operating the application module, namely, Dr. Smith. The user interface presentation 402 also includes a second title field 410 that conveys the identity of the patient, namely, John Jones.

The IEM 106 can extract application information from the application module in any of the ways described above. Generally, the IEM 106 can extract context information which indicates the type of action that the user is attempting to perform. Further, the IEM 106 can extract context information which indicates the identity of the patient, or, more generally, the target focus of the interaction between the user and the application module. In response to this application information and other collected information, the analysis engine 108 can identify supplemental information that may be pertinent to the user's interaction with the application module. The notification module 110 can then present an indicator to the user. The indicator alerts the user to the existence of the supplemental information.

Figure 5:
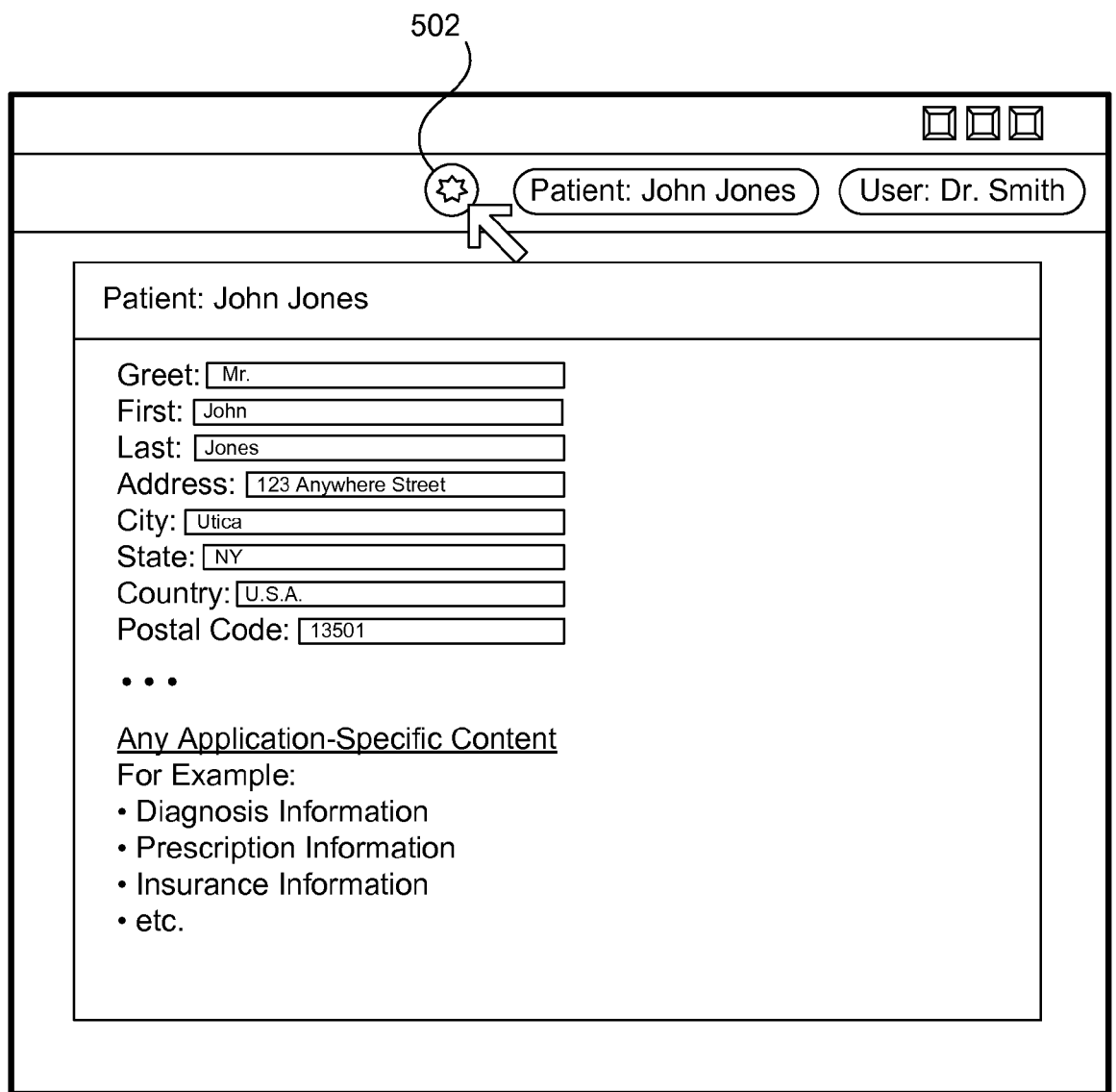

More specifically, in the case of FIG. 5, the notification module 110 presents an indicator 502 in the title bar of the user interface presentation 402. The indicator 502 in this case is an icon. Generally, the notification module 110 can display an indicator having any shape, size, color, informational content, etc.; further, the notification module 110 can present the indicator 502 at any location (or locations) in the user interface presentation 402. Alternatively, or in addition, the notification module 110 can present an audible indicator.

Assume that the user selects the indicator 502, e.g., by clicking on it or mousing over it, etc. In response, the notification module 110 can present supplemental information to the user. For example, as shown in FIG. 6, the notification module 110 can provide a panel 602 on the periphery of the user interface presentation 402. More generally, the notification module 110 can present the supplemental information in any manner and at any location; in doing so, the notification module 110 can adopt a presentation approach that does not unduly interfere with the user's interaction with the core content of the user interface presentation 402.

In the particular example of FIG. 6, the panel 602 can include a list of supplemental information items that pertain to the current context of the user's interaction with the application module. For example, a first supplemental information item provides a discharge summary for this patient. A second supplemental information item provides labs results for this patient. A third supplemental information item relates to radiology results, and so on. These examples are merely representative. For example, in another case, not shown, the notification module 110 can invite the user to review information obtained from a personal health repository maintained by the patient John Jones. In another example, not shown, the notification module 110 can provide medical alerts that pertain to this patient. In another example, not shown, the notification module 110 can provide diagnoses or recommended treatments that that pertain to this particular patient. In another example, not shown, the notification module 110 can provide trends or forecasts that pertain to this patient, e.g., based on an analysis of a population of similar patients, and so on. Once again, these examples are representative, not exhaustive. In general, note that the supplemental information items correspond to multiple informational axes associated with heterogeneous information sources, some of which may not be native suppliers of information to the application module. In other cases, the IMS 100 delivers supplemental information which is natively provided to the application module, but presents it in such a manner that differs from (or otherwise complements) the manner in which that information is typically delivered by the application module.

Figure 7:
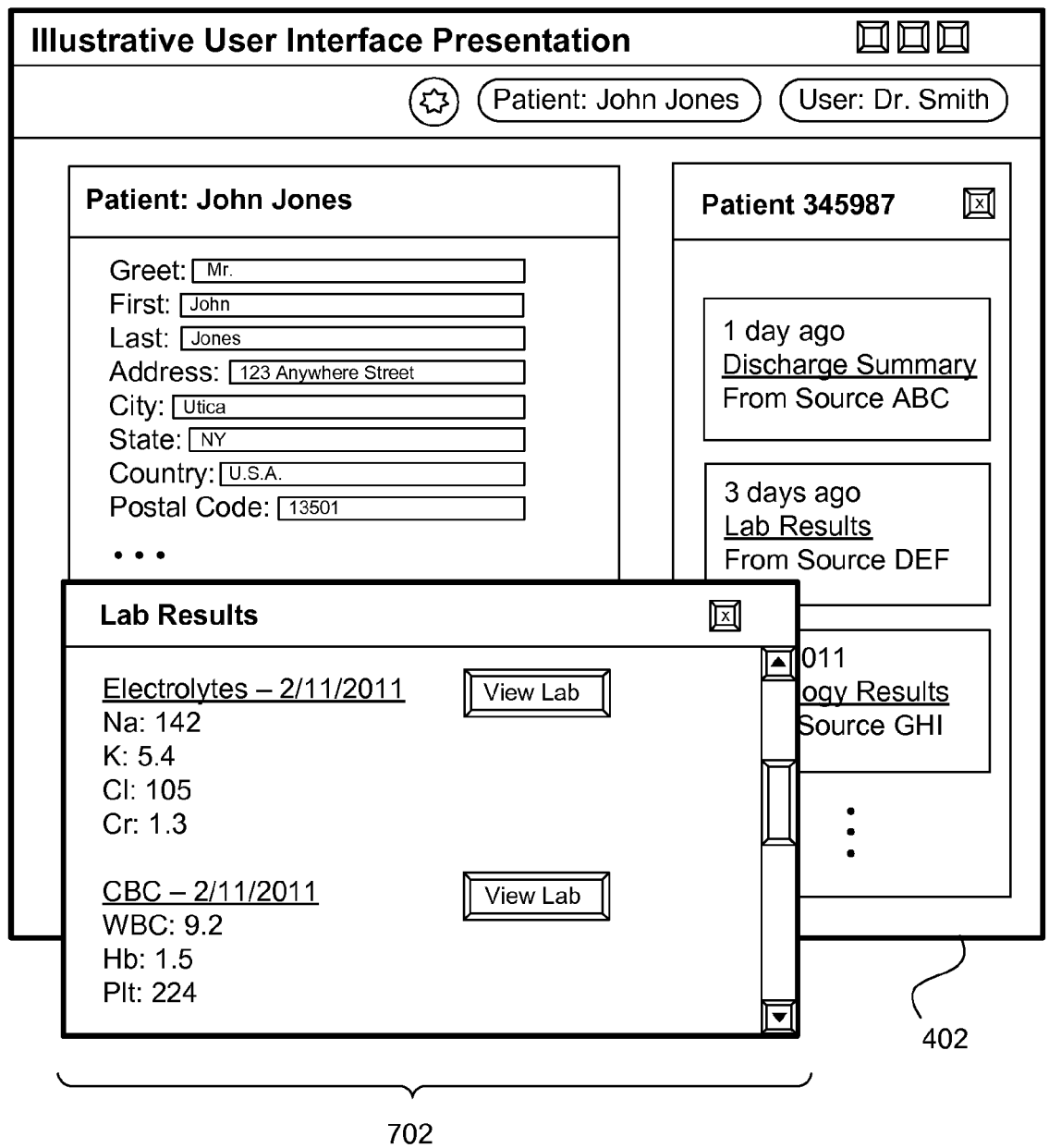

The supplemental information items can include hyptertext links or command buttons (or other selectable fields) which allow the user to obtain additional supplemental information. For example, assume that the user clicks on the link "Lab Results" in FIG. 6. In response, the notification module 110 delivers a panel 702 of additional supplemental information, as shown in FIG. 7. Depending on the manner in which the supplemental information is organized, the user can advance to yet further levels of detail. Further, the user can explore various branches of inquiry.

Figure 8:
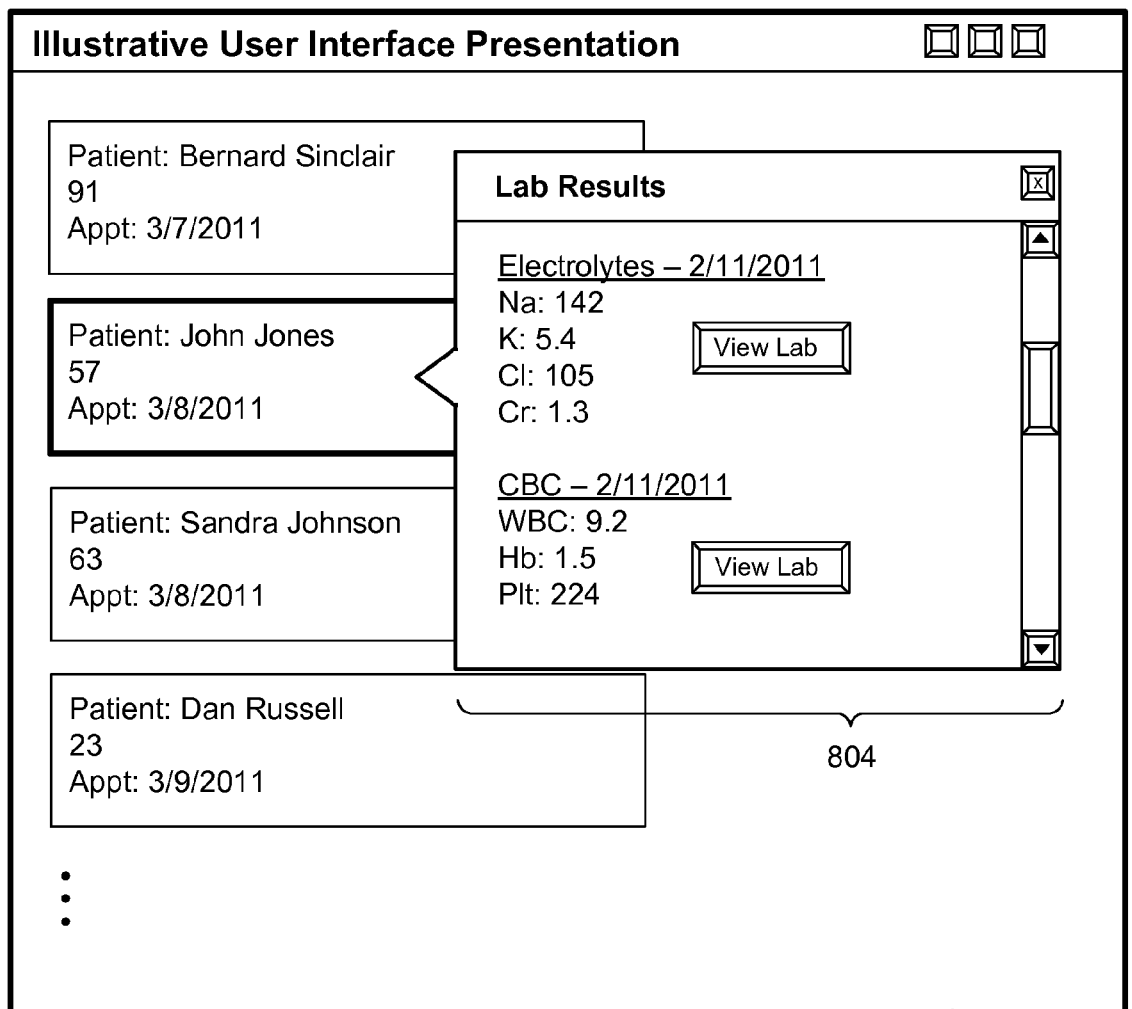

FIG. 8 shows another user interface presentation 802 that is provided by another type of application module. At this juncture in the user's interaction, the user interface presentation 802 provides information regarding a plurality of patients, rather than a single patient as set forth above. In this case, the user has selected a particular patient, again, the hypothetical patient John Jones. The IEM 106 responds to the selection by extracting application information pertaining to the current context. In response, the analysis engine 108 and the notification module 110 cooperate to provide a panel of supplemental information 804, e.g., providing lab results for the patient John Jones. The notification module 110 presents this supplemental information 804 adjacent to a field associated with the patient John Jones to convey the correlation between the supplemental information and the patient. Although not shown, the IMS 100 could also extract application information that pertains to the entire group of patients shown in the user interface presentation 802; the IMS 100 can then present supplemental information which globally pertains to the group of patients. In other examples, the target focus can correspond to non-human entities, as set forth above.

In the above examples, the notification module 110 presents the supplemental information to the user via the user interface presentation 120, in context with the user's interaction with the core experience provided by the application module 102. But in other cases, the notification module 110 can store the supplemental information in a separate file. The user can then independently and separately check this file before he or she commits to a decision regarding a patient. Still other notification strategies are possible.

B. Illustrative Processes

FIGS. 9-12 set forth procedures that explain the operation of the IMS 100 of FIG. 1 in flowchart form. Since the principles underlying the operation of the IMS 100 have already been described in Section A, certain operations will be addressed in summary fashion in this section.

Figure 9:
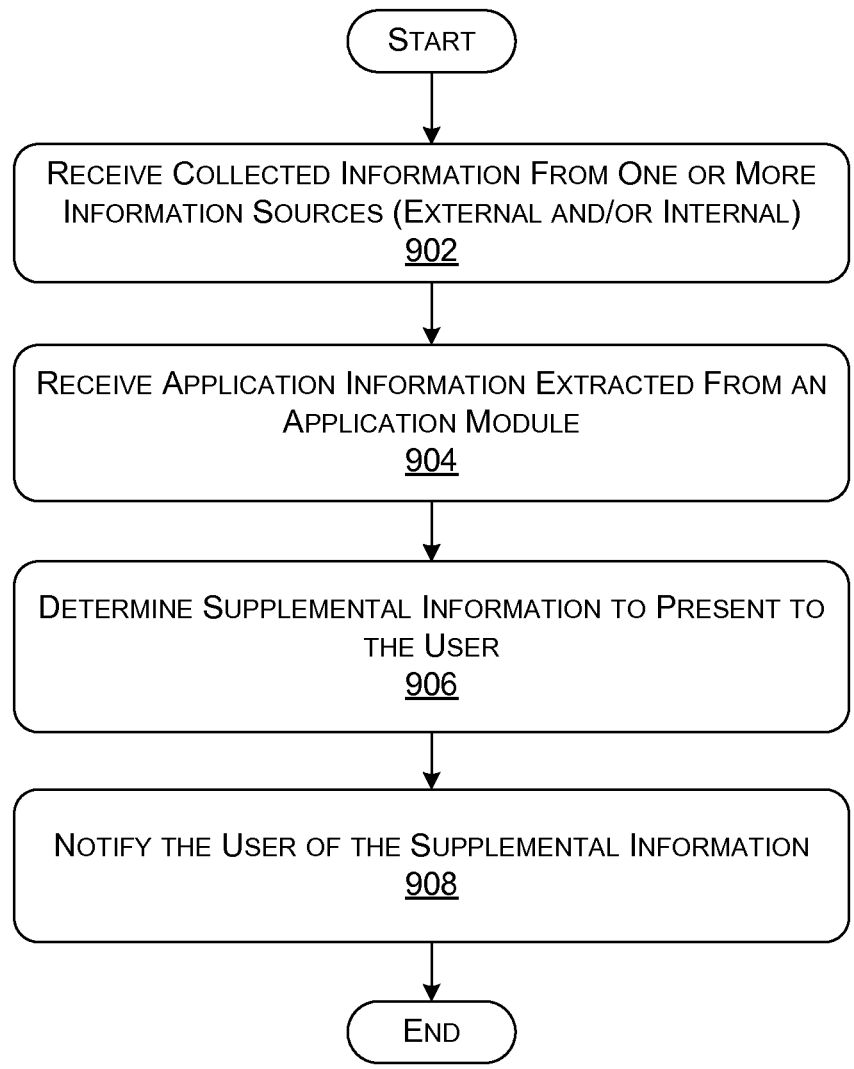
FIG. 9 is a flowchart that describes one manner of operation of the analysis engine of FIG. 1.

Starting with FIG. 9, this figure shows a procedure 900 that explains one manner of operation of the analysis engine 108. In block 902, the analysis engine 108 receives collected information from one or more information sources 112. In block 904, the analysis engine 108 receives application information from the application module 102 itself. In block 906, the analysis engine 108 identifies supplemental information to present based on the application information and collected information. The analysis engine 108 can rely on one or more analysis modules to perform this task. In block 908, the analysis engine 108 can notify the user of the existence of the supplemental information, e.g., by sending notification instructions to the notification module 110.

Figure 10:
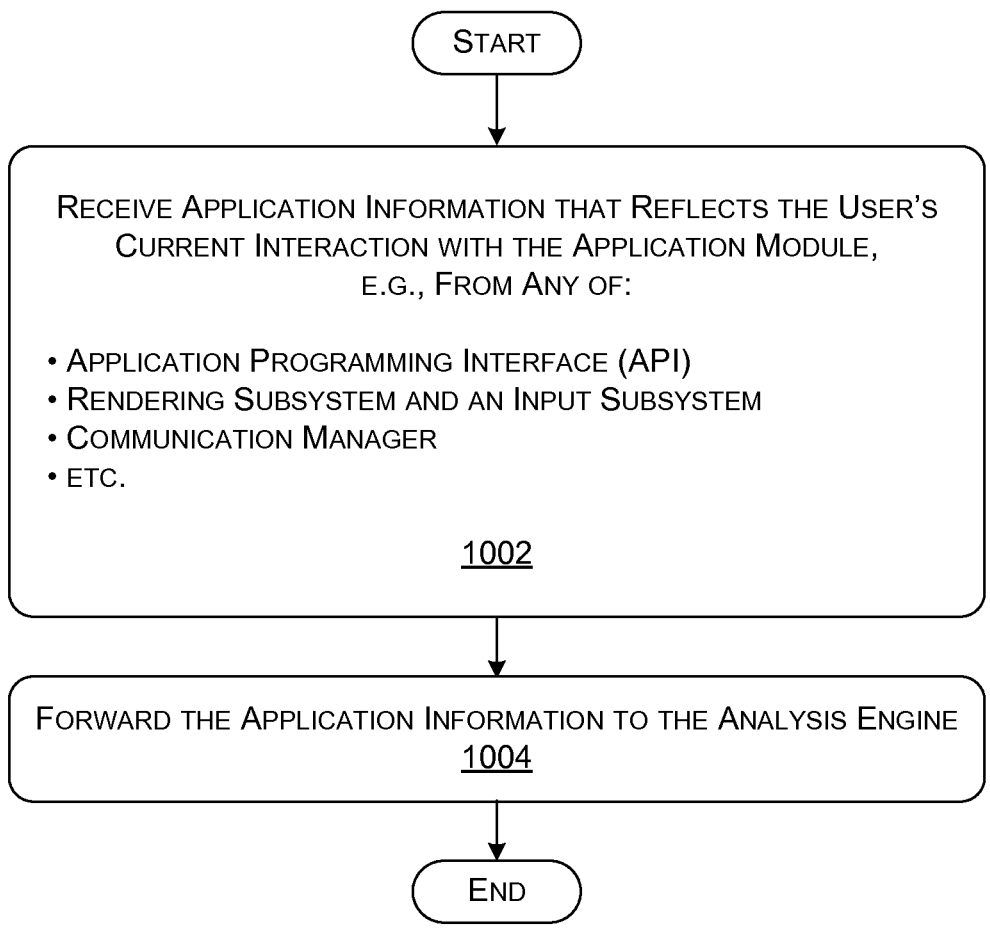
FIG. 10 is a flowchart that describes one manner of operation of the information extraction module of FIG. 1.

FIG. 10 shows a procedure 1000 that explains one manner of operation of the IEM 106 of FIG. 1. In block 1002, the IEM 106 receives application information which reflects the user's current interaction with the application module 102, as reflected by a current context. The IEM 106 can use any of the techniques described above to perform this task. In one case, the IEM 106 can receive information directly from a native interface of the application module 102. In another case, the IEM 106 can receive information in indirect fashion, e.g., based on content that will be presented on the user interface presentation 120, or based on information that the user inputs to the application module 102 via the user interface presentation 120, etc. In block 1004, the IEM 106 forwards the extracted application information to the analysis engine 108 for analysis.

In addition, any application module may itself comprise a source of information with respect to any other application modules. Hence, the IEM 106 can forward extracted application information to the collection system 104, where it is henceforth made available to other application modules. FIG. 1 illustrates this information path, e.g., which connects the application module 102 to the collection system 104.

Figure 11:
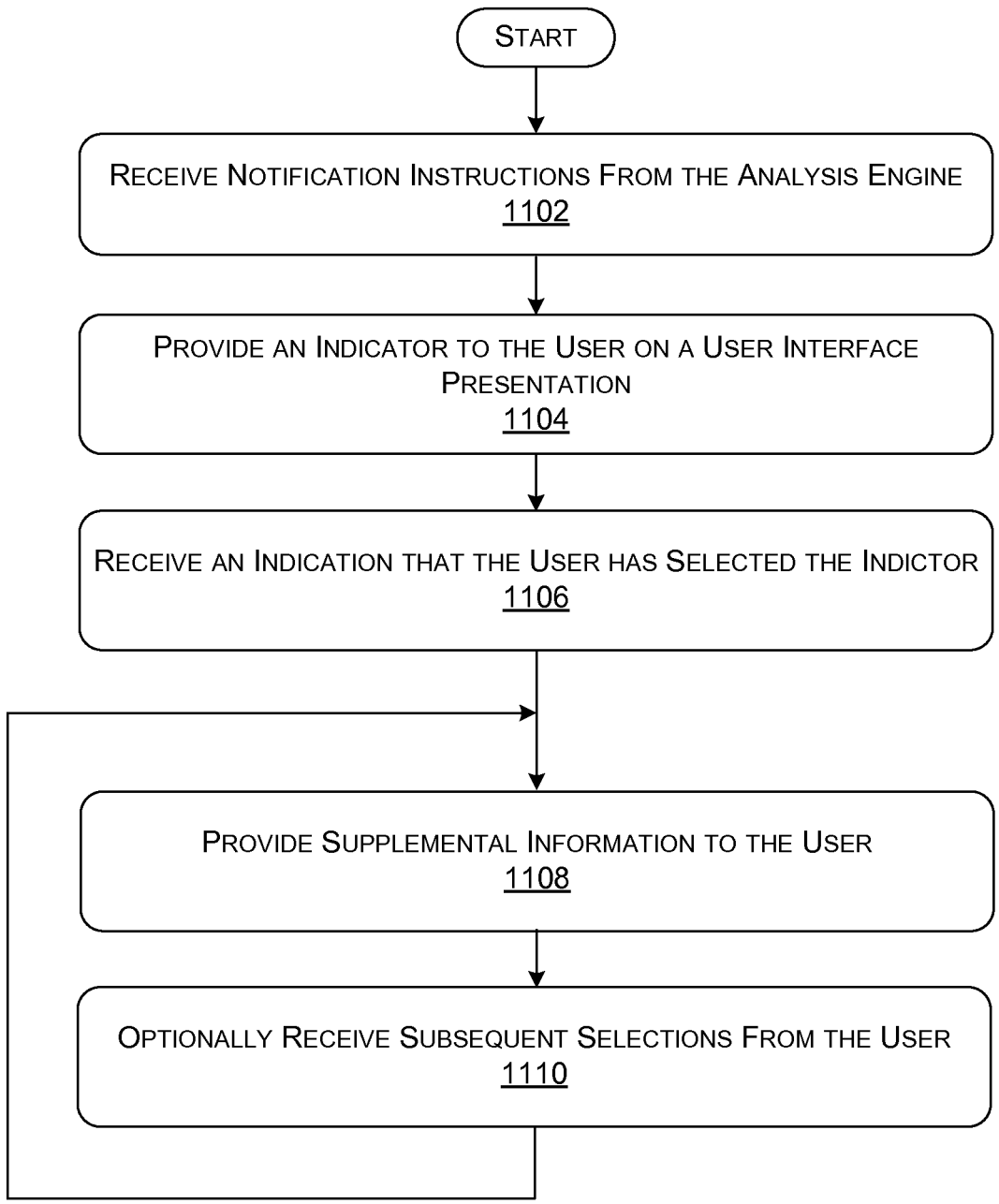
FIG. 11 is a flowchart that describes one manner of operation of the notification module of FIG. 1.

FIG. 11 shows a procedure 1100 that explains one manner of operation of the notification module 110 of FIG. 1. In one case, the notification module 110 receives notification instructions from the analysis engine 108, which instruct it to present certain items of supplemental information. In block 1104, the notification module 110 can present notification information which reveals the existence of the supplemental information. In one case, the notification information can provide the supplemental information itself, or at least part of the supplemental information. In another case, the notification information can correspond to an indicator which simply alerts the user to the existence of the supplemental information, without revealing its contents. In block 1106, assuming the latter situation applies, the notification module 110 receives the user's selection of the indicator. In block 1108, the notification module 110 presents supplemental information to the user in response to the user's selection. In block 1110, the notification module 110 optionally receives a further selection from the user, e.g., when the user selects one or more fields within the supplemental information presented in block 1108. This triggers the notification module 110 to present additional supplementation information. The operations in blocks 1108 and 1110 can be repeated any number of times as the user drills down within the supplemental information to a desired level.

Figure 12:
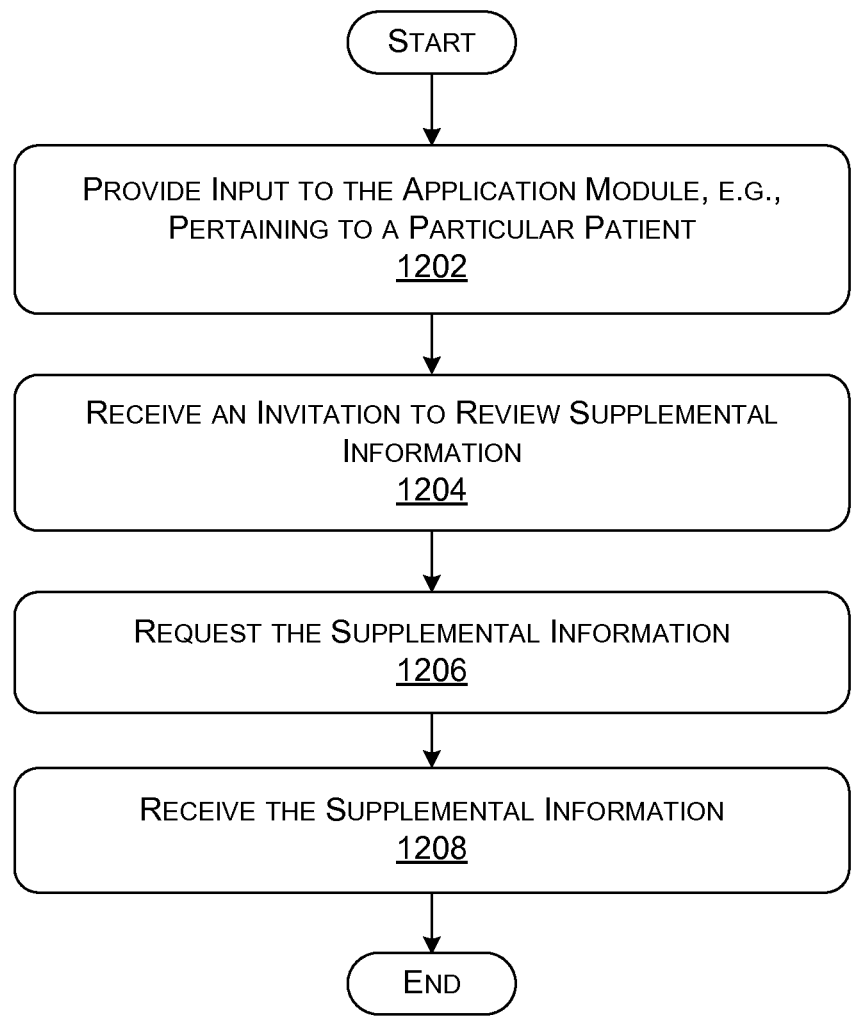
FIG. 12 is a flowchart that describes one manner of operation of the IMS of FIG. 1, from the perspective of a user who interacts with the IMS.

FIG. 12 shows a procedure 1200 that explains one manner of interacting with the IMS 100 of FIG. 1. In block 1202, the user provides input to the application module 102, e.g., pertaining to a particular task and pertaining to a particular patient or other target focus. In block 1204, the user receives an invitation to review supplemental information that pertains to the task and the patient or other target focus. In block 1206, the user requests to receive this supplemental information. And in block 1208, the user receives the supplemental information. This information may enable the user to make an informed decision regarding care provided to a patient or a group of patients.

C. Representative Processing Functionality

FIG. 13 sets forth illustrative electrical data processing functionality 1300 (also referred to herein a computing functionality) that can be used to implement any aspect of the functions described above. For example, the processing functionality 1300 can be used to implement any aspect of the IMS 100 of FIG. 1. In one case, the processing functionality 1300 may correspond to any type of computing device that includes one or more processing devices. In all cases, the electrical data processing functionality 1300 represents one or more physical and tangible processing mechanisms.

The processing functionality 1300 can include volatile and non-volatile memory, such as RAM 1302 and ROM 1304, as well as one or more processing devices 1306 (e.g., one or more CPUs, and/or one or more GPUs, etc.). The processing functionality 1300 also optionally includes various media devices 1308, such as a hard disk module, an optical disk module, and so forth. The processing functionality 1300 can perform various operations identified above when the processing device(s) 1306 executes instructions that are maintained by memory (e.g., RAM 1302, ROM 1304, or elsewhere).

More generally, instructions and other information can be stored on any computer readable medium 1310, including, but not limited to, static memory storage devices, magnetic storage devices, optical storage devices, and so on. The term computer readable medium also encompasses plural storage devices. In all cases, the computer readable medium 1310 represents some form of physical and tangible entity.

The processing functionality 1300 also includes an input/output module 1312 for receiving various inputs (via input modules 1314), and for providing various outputs (via output modules). One particular output mechanism may include a presentation module 1316 and an associated graphical user interface (GUI) 1318. The processing functionality 1300 can also include one or more network interfaces 1320 for exchanging data with other devices via one or more communication conduits 1322. One or more communication buses 1324 communicatively couple the above-described components together.

The communication conduit(s) 1322 can be implemented in any manner, e.g., by a local area network, a wide area network (e.g., the Internet), etc., or any combination thereof The communication conduit(s) 1322 can include any combination of hardwired links, wireless links, routers, gateway functionality, name servers, etc., governed by any protocol or combination of protocols.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system comprising:
 a processor configured to execute computer-readable instructions; and
 a storage device storing computer-readable instructions that, when executed by the processor, provide:
 a collection system configured to collect information from information sources including internal information sources within a healthcare-related enterprise environment, healthcare-related application programs that interact with the internal information sources, and external healthcare information sources outside of the healthcare-related enterprise environment, wherein the collection system classifies the information collected from the information sources and maintains a corpus of information collected from the information sources;
 an information extraction module configured to extract, from one of a plurality of application modules, during user interaction with the application module, a current context of the user interaction with a user interface presentation of the application module, wherein:
  the application module is a lab-related application module or a prescription application module,
  the current context indicates a task being performed by the user and a particular patient or a population of patients as a target focus of the task,
  the user interface presentation includes input fields within a form, and
  the current context is extracted based on information entered by the user into one or more input fields before the user activates a command to submit the form;
 an analysis engine configured to receive the current context from the information extraction module, wherein:
  the analysis engine is configured to identify, from the corpus of information, supplemental information that supplements content delivered via the user interface presentation of the application module and that pertains to the current context of the interaction by the user with the user interface presentation of the application module,
  the application module includes native functionality for interacting with one or more of the internal information sources,
  the supplemental information comprises information that is not natively available to the application module, and
  the application module lacks a native interface for exposing the current context to the analysis engine; and
 a notification module configured to present, in the user interface presentation of the application module, an indicator for alerting the user that the supplemental information exists, wherein:
  the notification module is configured to present the supplemental information while the user interacts with the user interface presentation of the application module in response to selection of the indicator by the user, and
  the notification module is configured to supplement the native functionality of the application module by delivering the supplemental information from the analysis engine to the user interface presentation of the application module.

2. The computing system of claim 1, wherein the external information sources include personal health information repositories maintained by end users.

3. The computing system of claim 1, wherein the task is entering data regarding a procedure or treatment provided to a particular patient.

4. The computing system of claim 1, wherein the information extraction module is configured to extract the current context from at least one of a rendering subsystem that provides the user interface presentation or an input subsystem that receives user input.

5. The computing system of claim 1, wherein the application module is remotely implemented with respect to the user.

6. The computing system of claim 1, wherein the analysis engine performs analysis based on an identified span of time.

7. The computing system of claim 1, wherein the analysis engine performs analysis based on an identified population of patients.

8. The computing system of claim 1, wherein:
 the current context indicates a particular patient as the target focus of the task, and
 the supplemental information pertains to patients that share a common characteristic with the particular patient.

9. The computing system of claim 1, wherein:
 the indicator is presented in a title bar of the user interface presentation, and
 the supplemental information is presented in a panel on the user interface presentation.

10. The computing system of claim 1, wherein the notification module automatically presents the indicator at a particular relevant juncture of the user interaction with the user interface presentation of the application module.

11. A method comprising:
 collecting, by a collection system implemented on a computer, information from information sources including internal information sources within a healthcare-related enterprise environment, healthcare-related application programs that interact with the internal information sources, and external healthcare information sources outside of the healthcare-related enterprise environment;
 classifying, by the collection system, the information collected from the information sources;

maintaining, by the collection system, a corpus of information collected from the information sources;
extracting, by an information extraction module implemented on the computer from one of a plurality of application modules, during user interaction with the application module, a current context of the user interaction with a user interface presentation of the application module, wherein:
  the application module is a lab-related application module or a prescription application module,
  the current context indicates a task being performed by the user and a particular patient or a population of patients as a target focus of the task,
  the user interface presentation includes input fields within a form, and
  the current context is extracted based on information entered by the user into one or more input fields before the user activates a command to submit the form;
receiving, by an analysis engine implemented on the computer, the current context from the information extraction module;
identifying, by the analysis engine from the corpus of information, supplemental information that supplements content delivered via the user interface presentation of the application module and that pertains to the current context of the interaction by the user with the user interface presentation of the application module, wherein:
  the application module includes native functionality for interacting with one or more of the internal information sources,
  the supplemental information comprises information that is not natively available to the application module, and
  the application module lacks a native interface for exposing the current context to the analysis engine;
presenting, by a notification module implemented on the computer, an indicator in the user interface presentation of the application module for alerting the user that the supplemental information exists; and
presenting, by the notification module, the supplemental information while the user interacts with the user interface presentation of the application module in response to selection of the indicator by the user, wherein:
  the notification module supplements the native functionality of the application module by delivering the supplemental information from the analysis engine to the user interface presentation of the application module.

12. The method of claim 11, wherein the current context is extracted from at least one of a rendering subsystem that provides the user interface presentation or an input subsystem that receives user input.

13. The method of claim 11, wherein the task is entering data regarding a procedure or treatment provided to a particular patient.

14. The method of claim 11, wherein:
the indicator is presented in a title bar of the user interface presentation, and
the supplemental information is presented in a panel on the user interface presentation.

15. The method of claim 11, wherein:
the current context indicates a particular patient as the target focus of the task, and
the supplemental information pertains to patients that share a common characteristic with the particular patient.

16. A computer-readable storage device storing computer-readable instructions that, when executed by a computer, cause the computer to:
  collect, by a collection system implemented on the computer, information from information sources including internal information sources within a healthcare-related enterprise environment, healthcare-related application programs that interact with the internal information sources, and external healthcare information sources outside of the healthcare-related enterprise environment;
  classify, by the collection system, the information collected from the information sources;
  maintain, by the collection system, a corpus of information collected from the information sources;
  extract, by an information extraction module implemented on the computer from one of a plurality of application modules, during user interaction with the application module, a current context of the user interaction with a user interface presentation of the application module, wherein:
    the application module is a lab-related application module or a prescription application module,
    the current context indicates a task being performed by the user and a particular patient or a population of patients as a target focus of the task,
    the user interface presentation includes input fields within a form, and
    the current context is extracted based on information entered by the user into one or more input fields before the user activates a command to submit the form;
  receive, by an analysis engine implemented on the computer, the current context from the information extraction module;
  identify, by the analysis engine from the corpus of information, supplemental information that supplements content delivered via the user interface presentation of the application module and that pertains to the current context of the interaction by the user with the user interface presentation of the application module, wherein:
    the application module includes native functionality for interacting with one or more of the internal information sources,
    the supplemental information comprises information that is not natively available to the application module, and
    the application module lacks a native interface for exposing the current context to the analysis engine;
  present, by a notification module implemented on the computer, an indicator in the user interface presentation of the application module for alerting the user that the supplemental information exists; and
  present, by the notification module, the supplemental information while the user interacts with the user interface presentation of the application module in response to selection of the indicator by the user, wherein:
    the notification module supplements the native functionality of the application module by delivering the supplemental information from the analysis engine to the user interface presentation of the application module.

17. The computer-readable storage device of claim 16, wherein the current context is extracted from at least one of a rendering subsystem that provides the user interface presentation or an input subsystem that receives user input.

18. The computer-readable storage device of claim 16, wherein:
   the indicator is presented in a title bar of the user interface presentation, and
   the supplemental information is presented in a panel on the user interface presentation.

19. The computer-readable storage device of claim 16, wherein the task is entering data regarding a procedure or treatment provided to a particular patient.

20. The computer-readable storage device of claim 16, wherein:
   the current context indicates a particular patient as the target focus of the task, and
   the supplemental information pertains to patients that share a common characteristic with the particular patient.

* * * * *

UNITED STATES PATENT AND TRADEMARK OFFICE
CERTIFICATE OF CORRECTION

| | | |
|---|---|---|
| PATENT NO. | : 8,473,307 B2 | Page 1 of 1 |
| APPLICATION NO. | : 12/970982 | |
| DATED | : June 25, 2013 | |
| INVENTOR(S) | : Bryan J. Dove et al. | |

It is certified that error appears in the above-identified patent and that said Letters Patent is hereby corrected as shown below:

In the Specification

In column 3, line 61, after "thereof" insert -- . --.

In column 11, line 14, after "on" insert -- . --.

In column 11, line 37, after "thereof" insert -- . --.

Signed and Sealed this
Tenth Day of February, 2015

Michelle K. Lee
*Deputy Director of the United States Patent and Trademark Office*